United States Patent
Agarwala et al.

(10) Patent No.: US 12,430,887 B2
(45) Date of Patent: Sep. 30, 2025

(54) SYSTEM AND METHOD FOR CLASSIFICATION OF OBJECTS BY A BODY TAPER DETECTION

(71) Applicant: CRON SYSTEMS PVT. LTD., New Delhi (IN)

(72) Inventors: Saurav Agarwala, New Delhi (IN); Tushar Chhabra, New Delhi (IN); Alankrit Mathur, New Delhi (IN)

(73) Assignee: CRON SYSTEMS PVT. LTD, New Delhi (IN)

(*) Notice: Subject to any disclaimer, the term of this patent is extended or adjusted under 35 U.S.C. 154(b) by 455 days.

(21) Appl. No.: 18/093,966

(22) Filed: Jan. 6, 2023

(65) Prior Publication Data

US 2023/0154155 A1 May 18, 2023

Related U.S. Application Data

(63) Continuation of application No. PCT/IB2021/056048, filed on Jul. 6, 2021.

(30) Foreign Application Priority Data

Jul. 8, 2020 (IN) .............................. 202011029114

(51) Int. Cl.
| | | |
|---|---|---|
| G06V 10/00 | (2022.01) | |
| G06V 10/20 | (2022.01) | |
| G06V 10/764 | (2022.01) | |

(52) U.S. Cl.
CPC ............ *G06V 10/764* (2022.01); *G06V 10/20* (2022.01)

(58) Field of Classification Search
CPC .... G06V 10/82; G06V 10/764; G06V 10/761; G06V 10/20; G06V 10/44; G06V 40/103; G06V 2201/12
See application file for complete search history.

(56) References Cited

U.S. PATENT DOCUMENTS

| | | | | |
|---|---|---|---|---|
| 8,428,310 | B2* | 4/2013 | Hall | G06V 10/147 |
| | | | | 382/116 |
| 8,620,036 | B2* | 12/2013 | Irmatov | G06V 40/16 |
| | | | | 382/206 |
| 9,489,635 | B1* | 11/2016 | Zhu | G06V 10/987 |
| 10,678,848 | B2* | 6/2020 | Govindaraj | G06N 3/044 |
| 11,120,311 | B2* | 9/2021 | Ha | G06V 10/82 |
| 11,507,783 | B2* | 11/2022 | Lee | G06F 18/2193 |

(Continued)

*Primary Examiner* — Amir Alavi
(74) *Attorney, Agent, or Firm* — Myers Wolin, LLC

(57) ABSTRACT

A method is provided for classification of objects by body taper detection. The method includes receiving point cloud data of a plurality of objects from one or more 3D sensors disposed in a space to be monitored, pre-processing the fused point cloud data to search, detect and segment the plurality of objects, each segmented object comprising a set of horizontal layers of interception from the 3D sensor representing the structure of the segmented object, calculating an inference ratio of each segmented object using lengths of respective horizontal layers, distances between set of horizontal layers and a distance of each segmented object from the one or more 3D sensors, checking whether the inference ratio of the segmented object lies on best fit curves pre-generated using a plurality of golden ratios associated with a particular class of objects, and accordingly determining the class of each of the segmented object.

16 Claims, 8 Drawing Sheets

(56) References Cited

U.S. PATENT DOCUMENTS

| | | | |
|---|---|---|---|
| 11,636,639 B2* | 4/2023 | Adamson, III | G06V 10/764 |
| | | | 345/629 |
| 11,710,324 B2* | 7/2023 | St. Romain, II | G06V 20/56 |
| | | | 382/159 |
| 12,154,349 B2* | 11/2024 | Lee | G06V 20/56 |
| 12,183,064 B2* | 12/2024 | Se | G06V 10/75 |
| 2019/0392205 A1* | 12/2019 | Tang | G05D 1/2285 |
| 2023/0154155 A1* | 5/2023 | Agarwala | G06V 10/44 |
| | | | 382/181 |

* cited by examiner

340

SYSTEM AND METHOD FOR CLASSIFICATION OF OBJECTS BY A BODY TAPER DETECTION

CROSS-REFERENCE TO RELATED APPLICATIONS

This application is a continuation of International Patent Application No. PCT/IB2021/056048, filed Jul. 6, 2021, which claims priority from Indian Patent Application No. 202011029114, filed Jul. 8, 2020, and these applications are incorporated herein by reference for all purposes as if fully set forth herein.

FIELD OF THE INVENTION

Embodiments of the present invention generally relate to object detection and identification technologies. Particularly, present disclosure relates to a system and method for classification of objects by a body taper detection.

BACKGROUND OF THE INVENTION

The subject matter discussed in the background section should not be assumed to be prior art merely as a result of it being mentioned in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Three-dimension (3D) sensing technology is widely used for several applications such as space exploration, agriculture, Autonomous Vehicles, Forestry, Law enforcement, Mining, Surveying, robotics, intelligent vehicle systems, augmented reality, transportation maps, and geological surveys. A plurality of 3D sensors either independently or in conjunction could be used for capturing three-dimensional data depending on the application. Some of the commonly used 3D sensors are LiDAR (Light Detection and Ranging), LADAR (Laser Detection and Ranging), LEDDAR (Light Emitting Diode Detection and Ranging), RADAR (Radio Detection and Ranging), Depth Measuring Cameras, and the like. Such 3D sensors capture and provide point cloud of data points.

For example, LiDAR units have the potential to be utilized extensively in applications like autonomous vehicle navigation, mobile computing, wearable devices etc. However, the search, detection and segmentation for human classification of objects cannot be met with present LiDAR approaches.

Most of the existing approaches, use only volumetric analysis to classify detected objects in 3d point cloud as humans. But when the space or the population is increased, it is highly likely to have false classifications. This is because when classification of an object is done via volumetric analysis, then a moving object which is not human but of similar volume as human would be classified as a human and therefore the correctness of classification cannot be guaranteed. Also, effects due to adverse weather conditions like high speed winds can cause foliage to be classified as humans when only classified via volumetric analysis. All such problems are unwanted in classification system. It is clear from above that such a method for volumetric analysis to classify objects is unreliable and does not provide ability to accurately and precisely classify detected objects as human, animals etc. through its surrounding environment.

Hence, there exists a need for a system and method for classification of objects by a body taper detection. Such system and method should be far more efficient than prior art, in terms of processing, space usage, time and resource consumption, cost & false classifications.

OBJECT OF THE INVENTION

An object of the invention is to provide a system and a method for classification of the objects.

Another object of the invention is to provide a system and a method for classification of objects using body taper detection to mitigate false classification.

Yet another object of the invention is to provide a system and a method for real time human classification for a user context application.

Yet another object of the present invention is to provide a 3D perception for search, detection and segmentation in a point cloud for human classification of the objects.

Yet another object of the present invention is to provide a unique taper ratio for objects including humans, animals etc. along with volume analysis to mitigate false classifications and improve the human classification ratio of the algorithms.

Yet another object of the present invention is to provide an algorithm to calculate the lengths of different horizontal layers of interception from the 3D sensor by which the object is segmented and represented.

Yet another object of the present invention is to provide an algorithm to calculate for a plurality of objects a golden ratio by generating a best-fit curve using the values of the ratio on the y axis and the distance of the object from the sensor on the x axis for multiple ratios.

Yet another object of the present invention is to provide an algorithm of lower time complexity for real time outputs, reduction in time and computational functions.

SUMMARY OF THE INVENTION

According to a first aspect of the present invention, there is provided a method for classification of objects by a body taper detection. The method comprises receiving point cloud data of a plurality of objects from one or more 3D sensors disposed in a space to be monitored; pre-processing the point cloud data to search, detect and segment the plurality of objects, each segmented object comprising a set of horizontal layers of interception from the 3D sensor representing the structure of the segmented object; calculating an inference ratio of each segmented object using lengths of respective horizontal layers, distances between set of horizontal layers and a distance of each segmented object from the one or more 3D sensors; checking whether the inference ratio of the searched, detected & segmented object lies on best fit curves pre-generated using a plurality of golden ratios associated with a particular class of objects; and determining the class of each of the searched, detected and segmented object when the inference ratio successfully lies on a best fit curve associated with the particular class of object, thereby classifying the plurality of objects in real-time.

In accordance with an embodiment of the present invention, the method further comprises a step of calibrating the point cloud data to a single origin, in case there are more than one 3D sensors disposed in the space to be monitored.

In accordance with an embodiment of the present invention, the plurality of objects are selected from one or more of living and non-living objects including humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

In accordance with an embodiment of the present invention, the step of calculating the inference ratio of each segmented object includes determining a length of each of the set of horizontal layers of interception from the 3D sensor representing the segmented object.

In accordance with an embodiment of the present invention, the class of objects are selected from humans, animals, furniture, automobiles, tools and electronics.

In accordance with an embodiment of the present invention, the plurality of best fit curves associated with the plurality of classes are generated using machine learning by: calculating a plurality of ratios of a set of objects belonging to a particular class at a plurality of distances from the one or more 3D sensors and obtaining a respective golden ratio for the particular class at the plurality of distances; obtaining the golden ratios of the plurality of classes of the plurality of objects; and generating the best fit curve for each of the plurality of classes using the respective plurality of golden ratios and the plurality of distances. Further, the golden ratio for each class of objects is continuously improved by increasing a number/size of the 'set' of objects belonging to the same class used for calculation of the golden ratio, during modelling and training.

In accordance with an embodiment of the present invention, the one or more 3D sensors are selected from a Light Detection and Ranging (LIDAR) sensor, Laser Detection and Ranging (LaDAR), Light Emitting Diode Detection and Ranging (LeDDAR) mmWave Radar, C or K Band Radar, Time of Flight (ToF) sensors, laser scanners or a combination thereof.

In accordance with an embodiment of the present invention, the method further comprises a step of visual identification of the plurality of objects after classification, using one or more visual cameras.

According to a second aspect of the present invention, there is provided a system for classification of objects by a body taper detection. The system comprises one or more 3D sensors disposed in a space to be monitored; and a processing module connected with each of the one or more 3D sensors. The processing module comprises a memory unit configured to store machine-readable instructions; and a processor operably connected with the memory unit. The processor obtains the machine-readable instructions from the memory unit, and is configured by the machine-readable instructions to receive point cloud data of a plurality of objects from the one or more 3D sensors; pre-process the point cloud data to search, detect and segment the plurality of objects, each segmented object comprising a set of horizontal layers of interception from the 3D sensor representing the structure of the segmented object; calculate an inference ratio of each segmented object using lengths of respective lines, distances between set of horizontal layers and a distance of each segmented object from the one or more 3D sensors; check whether the inference ratio of the searched, detected & segmented object lies on best fit curves pre-generated using a plurality of golden ratios associated with a particular class of objects; and determine the class of each of the searched, detected and segmented object when the inference ratio successfully lies on a best fit curve associated with the particular class of object, thereby classifying the plurality of objects in real-time.

In accordance with an embodiment of the present invention, the processor is further configured to calibrate the point cloud data to a single origin, in case there are more than one 3D sensors disposed in the space to be monitored.

In accordance with an embodiment of the present invention, the plurality of objects are selected from one or more of living and non-living objects including humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

In accordance with an embodiment of the present invention, for calculating a inference ratio of each segmented object, the processor is configured to determine a length of each of the set of horizontal layers of interception from the 3D sensor representing the segmented object.

In accordance with an embodiment of the present invention, the class of objects are selected from humans, animals, furniture, automobiles, tools and electronics.

In accordance with an embodiment of the present invention, the plurality of best fit curves associated with the plurality of classes are generated using machine learning by: calculating a plurality of ratios of a set of objects belonging to a particular class at a plurality of distances from the one or more 3D sensors and obtaining a respective golden ratio for the particular class at the plurality of distances; obtaining the golden ratios of the plurality of classes of the plurality of objects; and generating the best fit curve for each of the plurality of classes using the respective plurality of golden ratios and the plurality of distances. Further, the golden ratio for each class of objects is continuously improved by increasing a number/size of the 'set' of objects belonging to the same class used for calculation of the golden ratio, during training and modelling.

In accordance with an embodiment of the present invention, the one or more 3D sensors are selected from a Light Detection and Ranging (LIDAR) sensor, Laser Detection and Ranging (LaDAR), Light Emitting Diode Detection and Ranging (LeDDAR) mmWave Radar, C or K Band Radar, Time of Flight (ToF) sensors, laser scanners or a combination thereof.

In accordance with an embodiment of the present invention, the processor is further configured to facilitate visual identification of the plurality of objects after classification, using one or more visual cameras.

BRIEF DESCRIPTION OF THE DRAWINGS

So that the manner in which the above recited features of the present invention can be understood in detail, a more particular to the description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, the invention may admit to other equally effective embodiments.

These and other features, benefits and advantages of the present invention will become apparent by reference to the following text figure, with like reference numbers referring to like structures across the views, wherein.

DETAILED DESCRIPTION OF THE DRAWINGS

Figure 1A:
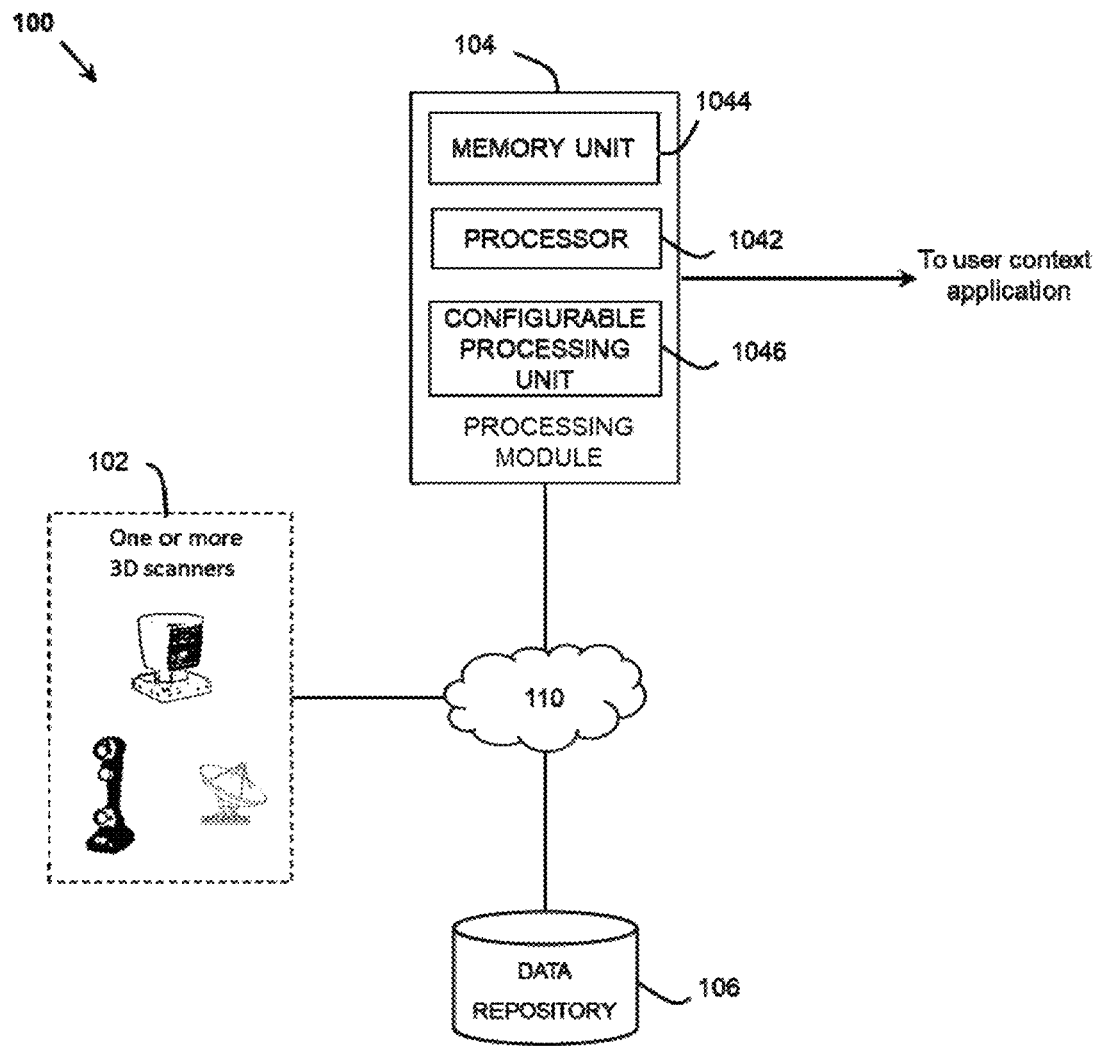
FIG. 1A illustrates a system for classification of objects by a body taper detection, in accordance with an embodiment of the present invention.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

The present invention is described hereinafter by various embodiments with reference to the accompanying drawings, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

The present invention is described hereinafter by various embodiments. This invention may, however, be embodied in many different forms and should not be construed as limited to the embodiment set forth herein. Rather, the embodiment is provided so that this disclosure will be thorough and complete and will fully convey the scope of the invention to those skilled in the art. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope.

The present invention utilises a concept that every object including humans, have a unique body structure that has its own unique taper. For example: Human body structure has a taper that exists from top of the body to the waist and then again from waist to the toes. There is a unique ratio for a human body and every other object. Hence, the present invention generates the unique feature of taper ratio in the human body and other objects and uses it independently and/or along with volume analysis to mitigate these false object classifications and improve the object classification.

FIG. 1A illustrates a system (100) for classification of objects by a body taper detection, in accordance with an embodiment of the present invention. As shown in FIG. 1, the system (100) comprises of one or more data capturing devices (102) disposed in a space to be monitored and a processing module (104) connected with the one or more data capturing devices (102). Space may be anything such as, but not limited to, a house, an office, a mall, a perimeter, secured site, a border, farm or any space that requires surveillance. The processing module (104) may further be connected with a user context application such as, but not limited to, intrusion detection, perimeter fencing, surveillance, border security, home security, agriculture, astronomy, atmosphere, Autonomous Vehicles, Biology and conservation, Forestry, Geology and soil science, Law enforcement, Mining, Image Recognition, Surveying, robotics, intelligent vehicle systems, augmented reality, transportation maps and geological surveys where high resolution digital elevation maps help in detecting subtle topographic features.

The one or more 3D sensors (102) are selected from, but not limited to, LiDARs, Laser Detection and Ranging (LaDAR), Light Emitting Diode Detection and Ranging (LeDDAR) mmWave Radar, C or K Band Radar, laser scanners, Time of Flight (ToF) sensors or a combination thereof.

The one or more data capturing devices (102) are envisaged to capture object data in their Field of View, inside the space (3D surrounding/environment) where the one or more 3D sensors (102) are positioned. The object data is in a form of, but not limited to, 2D or 3D point clouds or data points in 2D or 3D. The plurality of objects may be all kinds of living and non-living objects selected from a group comprising, but not limited to, humans, animals, plants, furniture, vehicles, natural resources, eatables, crops, infrastructure, stationery, sign boards, wearables, musical instruments, sports equipment, mechanical tools, electrical equipment & electronic equipment.

Further, the processing module (104) is envisaged to include computing capabilities such as a memory unit (1042) configured to store machine readable instructions. The machine-readable instructions may be loaded into the memory unit (1042) from a non-transitory machine-readable medium, such as, but not limited to, CD-ROMs, DVD- ROMs and Flash Drives. Alternately, the machine-readable instructions may be loaded in a form of a computer software program into the memory unit (1042). The memory unit (1042) in that manner may be selected from a group comprising EPROM, EEPROM and Flash memory. The processing module (104) has been shown in a detailed block diagram in FIG. 1B, in accordance with an embodiment of the present invention.

Figure 1B:
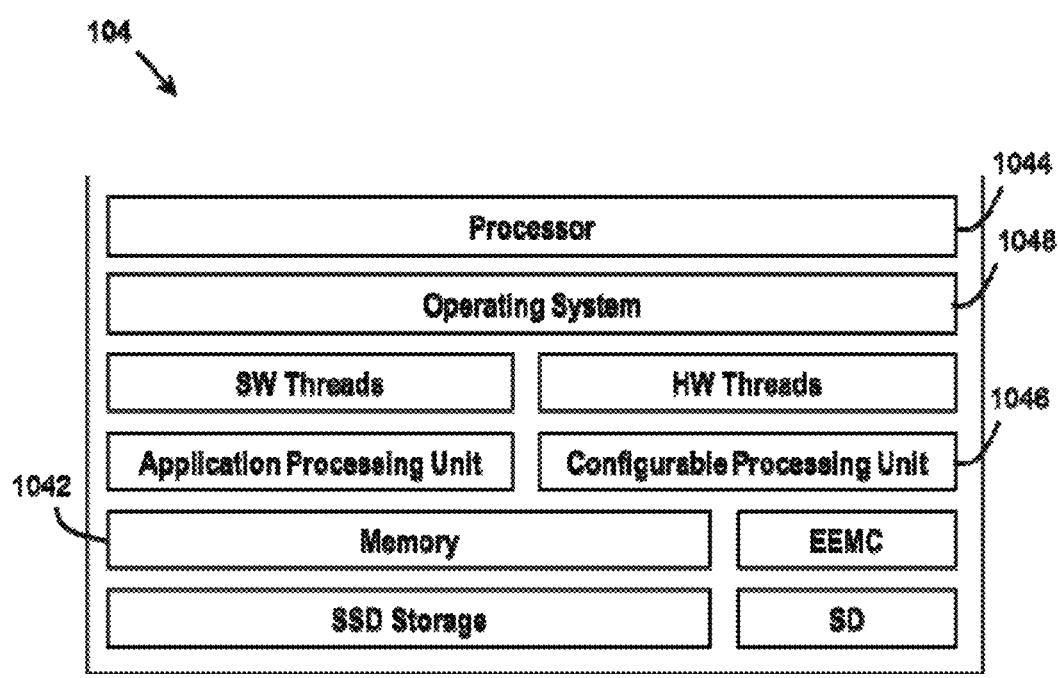
FIG. 1B illustrates a block diagram of a processing module of the system of FIG. 1A, in accordance with an embodiment of the present invention.

The processing module (104) has been shown in a detailed block diagram in FIG. 1B, in accordance with an embodiment of the present invention. As shown in FIG. 1B, the processing module (104) includes a processor (1044) operably connected with the memory unit (1042). In various embodiments, the processor (1044) may be a microprocessor selected from one of, but not limited to a ARM based or Intel based processor (1044) in the form of field-programmable gate array (FPGA), a general-purpose processor and an application specific integrated circuit (ASIC). Additionally, the processing module (104) may further include a configurable processing unit (1046), an operating system (1048), an Application Processing Unit (APU), Hardware (HW) threads, Software (SW) threads, SSD storage, EMCC, SD etc.

The APU is for highly sequential processing and a configurable Processing Unit (1046) is for parallel execution, customization, deep pipelining as a custom soft logic core to improve performance and energy efficiency. There may also be a DL inference engine that requires high performance and energy efficiency and hence runs on a HW thread with a Custom Hardware Accelerator Soft Logic Core on the Reconfigurable Computing Platform. Further, the operating system (1048) has been implemented for the configurable Processing Unit (1046) to offer a unified multithreaded programming model and OS services for threads executing in software and threads mapped to the Reconfigurable Hardware. The Operating System (1048) semantically integrates hardware accelerators into a standard OS environment for rapid design-space exploration, to support a structured application development process, and to improve the portability of applications between different Reconfigurable Processing Systems. The Operating System (1048) makes sure that from the perspective of an application, it is thus completely transparent whether a thread is executing in software or hardware.

Moreover, the processing module (104) may implement artificial intelligence and deep learning-based technologies for, but not limited to, data analysis, collating data & presentation of data in real-time.

In accordance with an embodiment of the present invention, a communication network (110) may also be used in the system (100) for connecting the components within the system (100) or connecting the processing module (104) with a remote analytic system. The communication network (110) can be a short-range communication network and/or a long-range communication network, wire or wireless communication network. The communication interface includes, but not limited to, a serial communication interface, a parallel communication interface or a combination thereof. The communication network (110) may be implemented using a number of protocols, such as but not limited to, TCP/IP, 3GPP, 3GPP2, LTE, IEEE 802.x etc. The communication network (110) may be wireless communication network selected from one of, but not limited to, Bluetooth, radio frequency, internet or satellite communication network providing maximum coverage.

Additionally, the system (100) may include a data repository (106). The data repository (106) may be a local storage (such as SSD, eMMC, Flash, SD card, etc.) or a cloud-based storage. In any manner, the data repository (106) is envisaged to be capable of providing the data to the processing module (104), when the data is queried appropriately using applicable security and other data transfer protocols. The data repository (106) may store the data (a plurality of golden ratios and best-fir curves of multiple classes of objects obtained through regression) and deep learning trained models of the multiple objects of all kinds of living and non-living objects selected from a group comprising, but not limited to, humans animals, plants, furniture, vehicles, natural resources, eatables, crops, infrastructure, stationery, sign boards, wearables, musical instruments, sports equipment, mechanical tools, electrical equipment, electronic equipment, and the like.

In one aspect, the system (100) may be implemented in an embedded system (100) having the one or more 3D sensors (102), the data repository (106), and the processing module (104). In another aspect, the system (100) may be a distributed system with the one or more 3D sensors (102) being externally disposed and connected with the processing module (104) & the data repository (106) in a separate computing device. A person skilled in the art would appreciate that the system (100) may be implemented in a plurality of ways.

Figure 2:
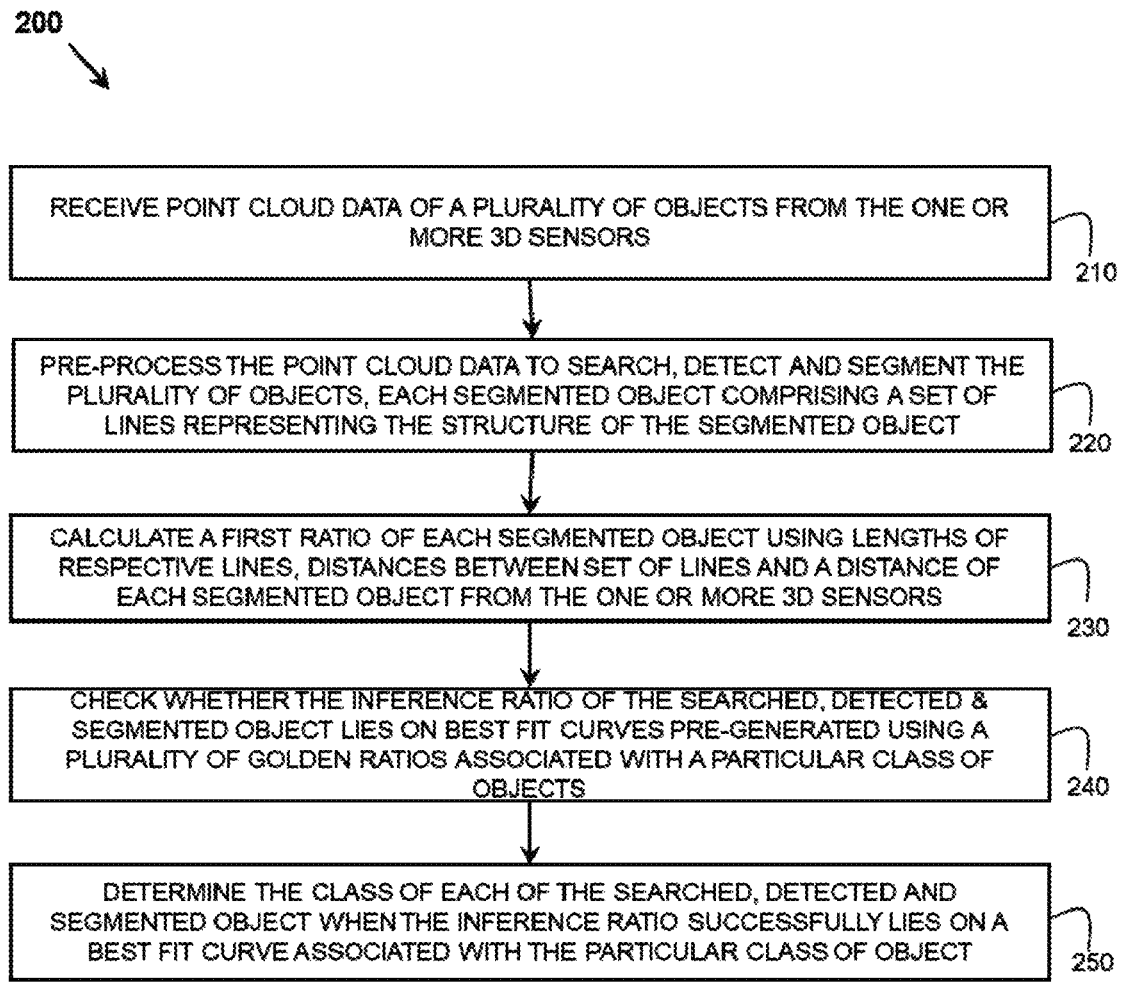
FIG. 2 illustrates a method for classification of objects by a body taper detection, in accordance with an embodiment of the present invention.
Figure 3A:
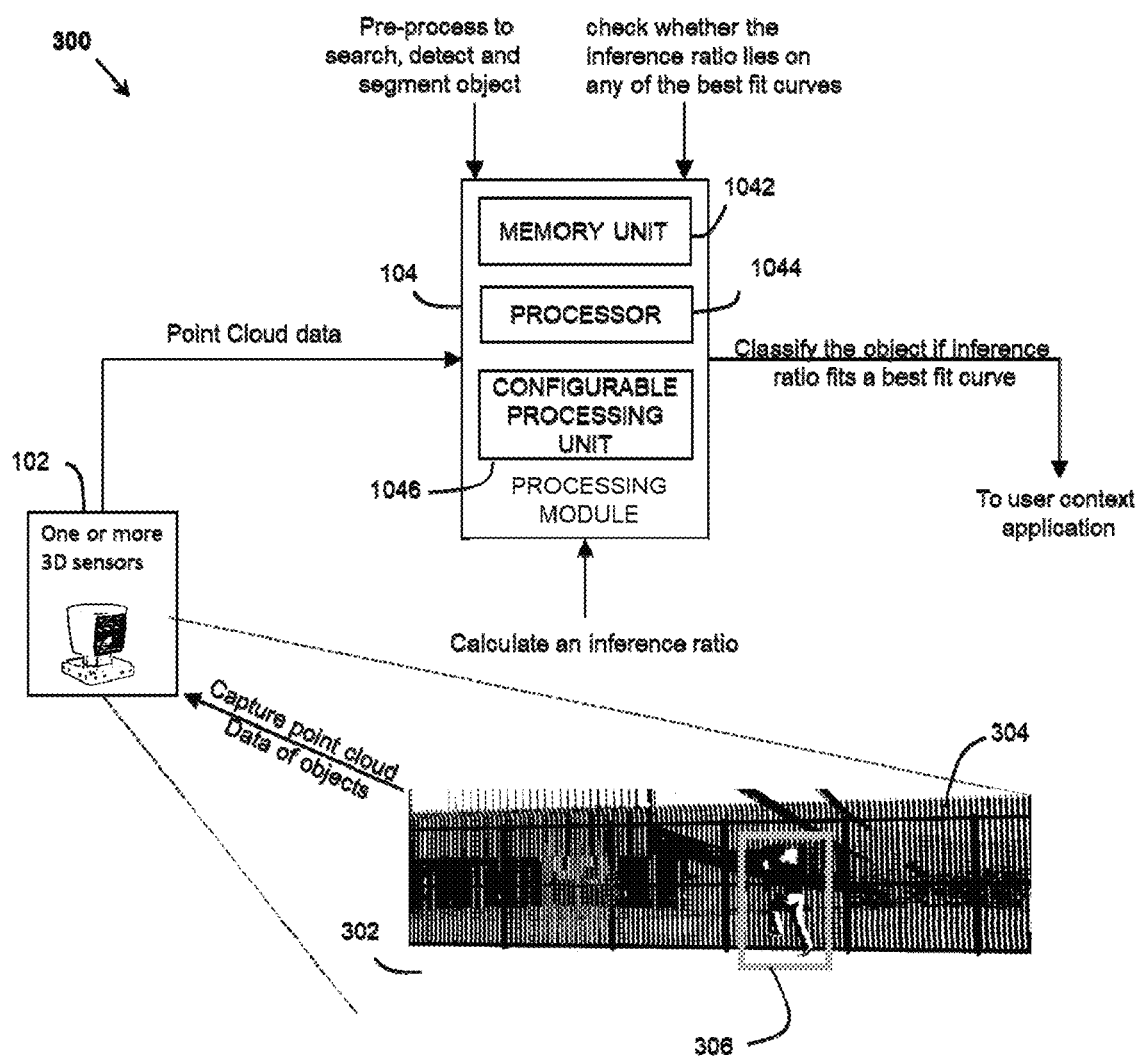
FIG. 3A-3F illustrate information flow and an exemplary implementation of system and method shown FIG. 1A and FIG. 2, in accordance with an embodiment of the present invention.
Figure 3B:
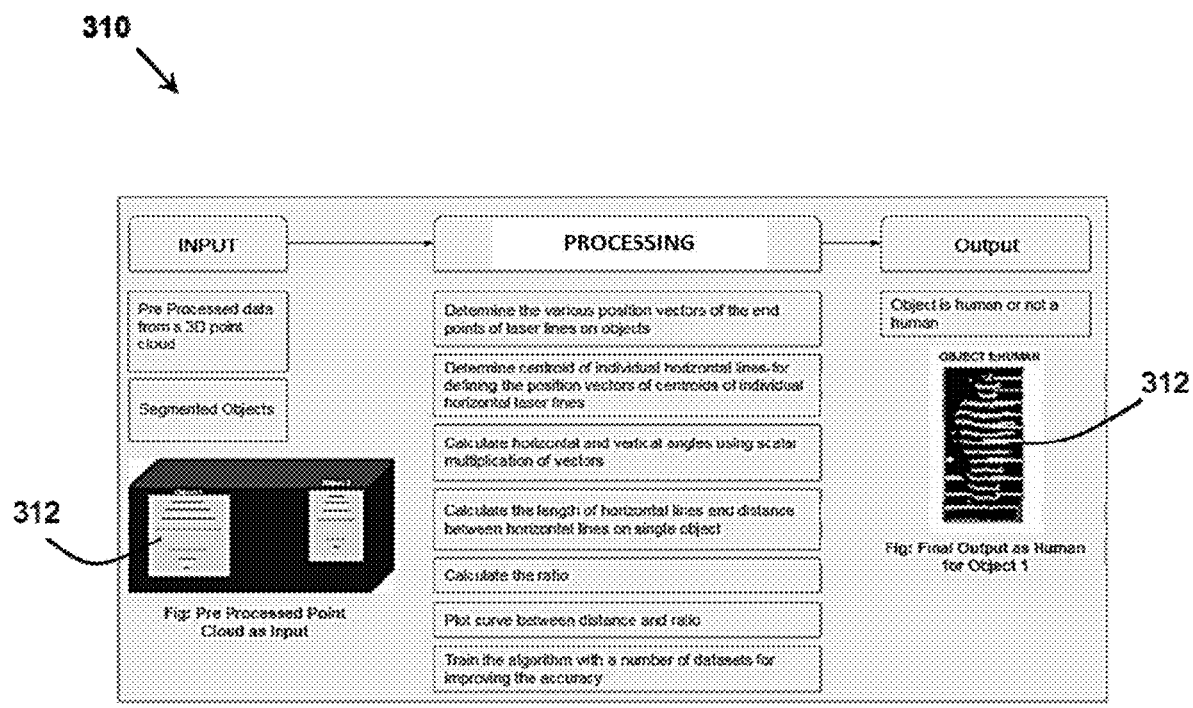

FIG. 2 illustrates a method (200) for classification of objects by a body taper detection, in accordance with an embodiment of the present invention. The method (200) shown in FIG. 2, is capable of detecting and classifying all the detected objects in real time as humans, animals, cars or any other class of object. This method (200) would be understood more clearly with the help of an exemplary implementation and information shown in FIGS. 3A & 3B. However, the examples shown in FIGS. 3A and 3B are for specifically for perimeter fencing of a property (user context application) for detection of any intrusion by a human. Herein a user context application only aims to catch hold of any human that tries to come close to the fence, and not any other object.

As shown in FIG. 2, the method (200) starts at step 210, by receiving point cloud data of a plurality of objects from one or more 3D sensors (102) disposed in a space (302) to be monitored. As already mentioned, the one or more 3D sensors (102) may be, but not limited to, radars, LiDARs, Laser Detection and Ranging (LaDAR), Light Emitting Diode Detection and Ranging (LeDDAR) mmWave Radar, C or K Band Radar laser scanners and a combination thereof. The same has also been illustrated in FIGS. 3A & 3B. As shown in FIGS. 3A and 3B, point cloud data is captured from the space (302) that comprise a fence (304) which is to be checked for any intrusion. The space (302) herein is a private property. Additionally, a threshold distance may also be provided (if required) to the processing module (104).

In accordance with an embodiment of the present invention, where there are multiple 3D sensors monitoring the space, then the point cloud data received from each of those 3D sensors have different origins depending upon their positioning. In that case, before moving forward with the method (200), the processor calibrates the point cloud data to a single origin. In one example/embodiment, this may be done by transposing the origin and thereby the cartesian coordinates of the point cloud data obtained from all the 3D sensors to a single 3D sensor. In case, there is only 3D sensor deployed to monitor the space, the calibration may not be required.

Returning to FIG. 2, at step 220, the processing module (104) is configured to pre-processing the point cloud data to search, detect and segment the plurality of objects. The processing module (104) first searches and detects a presence of an object (306) in the space (302). It has been clearly shown in FIG. 3A in white box. A skilled addressee would appreciate that the view shown in FIG. 3A is shown only for explanation/illustration purpose to make it easier to visualise. However, the point cloud data from one or more 3D sensors (102) does not include visuals as shown in FIG. 3A but it shows the point cloud being shown as a set of horizontal layers (312) of interception from the one or more 3D sensors (102) shown in FIG. 3B. The illustration of FIG. 3A is possible when the one or more 3D sensors (102) are coupled with a visual/thermal camera (which not an essential part of the present invention). So, the searched, detected and segmented object (304) is represented as the set of horizontal layers (312). As can be seen in FIG. 3B, the each of the set of horizontal layers (312) have a certain length and are present at a certain distance from each other depending upon structure/shape of the object (304), a type of one or more 3D sensors (102) used, number channels in the one or more 3D sensors (102), distance of the object of from the one or more 3D sensors (102) etc. The set of horizontal layers (312) have a taper that form an outline of the object (304).

Then at step 230, the processor (1044) is configured to calculate an inference ratio of each segmented object using lengths of respective horizontal layers (312), distances between set of horizontal layers (312) and a distance of each segmented object from the one or more 3D sensors (102).

For calculating the inference ratio, the lengths of each layer of the set of horizontal layers (312) is required to be determined first. The processor (1044) may determine the various position vectors of the endpoints of horizontal layers on segmented objects (in case of FIG. 3A/3B, there is only one object (304) to be classified). Further, the processing module (104) may determine centroid of each horizontal layer of the set of horizontal layers (312) for defining the position vectors of centroids of individual horizontal layers and calculating horizontal and vertical angles using scalar multiplication of vectors.

Figure 3C:
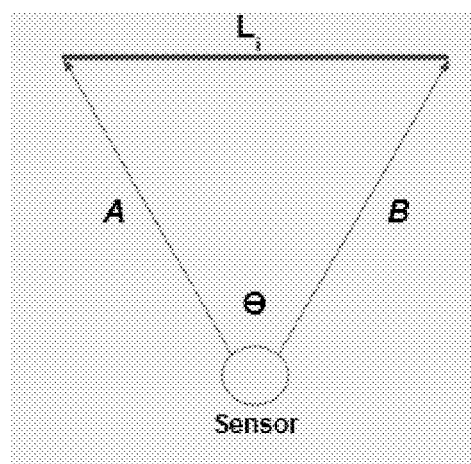

FIG. 3C illustrates a top view for calculating angle θ, wherein θ is the angle between the position vectors A and B. The process for calculating a length of each of the set of horizontal layers might be explained by using the arc length formula, which may L=R*sin(θ). The "R" value might be calculated as the arithmetic mean value of the two distance values obtained from the end points of the horizontal layer or from the magnitude of position vectors of the end points. Determining the scalar multiplication of vectors to find out the angles between two position vectors using the formula A·B=|A| |B| cos θ, where θ may be in radians.

Figure 3D:
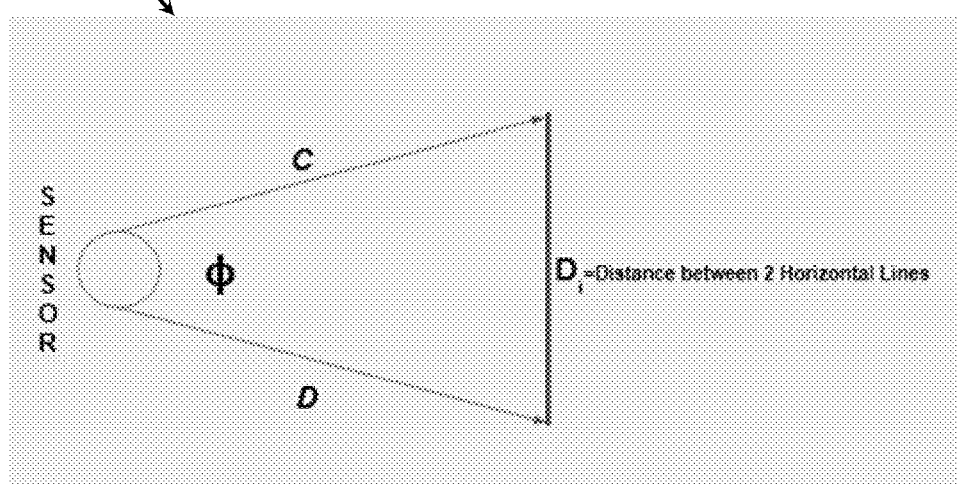

FIG. 3D illustrates a side view for calculating angle φ, wherein φ is the angle between the position vectors of the centroid of the set of horizontal layers of interception from the 3D sensor. The process for calculating the distance between two horizontal layers in the set of horizontal layers might be explained by using the arc length formula, which may L=R*sin(φ)). The "R" value might be calculated as the arithmetic mean of the magnitude of the position vectors of centroids of each horizontal layer. Determining the position vectors of the centroids of the horizontal layers and performing scalar multiplication on the 2 position vectors using the formula (C)·(D)=|C| |D| cos φ (φ may be in radians), where C may be a position vector of centroid of horizontal layer L1 and might be calculated by performing arithmetic mean between position vectors of end points of horizontal layer L1 (i.e. arithmetic mean of A and B), and D may be a position vector of centroid of horizontal layer L2 and might be calculated by performing arithmetic mean between position vectors of end points of horizontal layer L2.

Now, using the above information of lengths of each layer and distance between the set of horizontal layers of interception from the 3D sensor (312), the inference ratio may be calculated in a number of ways. In first method (200), inference ratio might be equal to the ratio of sum of distances between two consecutive horizontal layers (L1 and L2, L2 and L3 and so on) and sum of lengths of all the layers.

$$\text{Ratio } 1 = \frac{\text{(Sum of Distances between } L_i \text{ and } L_{i+1} \text{ for } i = 1 \text{ to } n)}{\text{(Sum of distances of all layers } L_i + L_{i+1} + L_{i+2} + \ldots L_n)}$$

where n is the number of layers passing through the object.

In another way, the inference ratio might be equal to the ratio of sum of lengths of all layers cutting the object and product of number of layers cutting object and sum of distances between two consecutive layers (L1 and L2, L2 and L3 and so on)

$$\text{Ratio } 2 = \frac{(Li + L_{i+1})}{\text{(Sum of Distances between } Li \text{ and } L_{i+1} \text{ for } i = 1 \text{ to } n) \times \text{(Number of beams cutting the object)}}$$

where n is the number of layers passing through the object.

In yet another way, the inference ratio might be equal to the ratio between the sum of distances between of all consecutive layers cutting the object and product of number of beams cutting the object and distance of object from sensor, where $$\text{Ratio } 3 = \frac{\text{(Sum of Distances between } Li \text{ and } Li + 1 \text{ for } i = 1 \text{ to } n)}{[\text{(Distance of object from sensor)} \times \text{(Number of beams cutting the object)}]}$$

where n is the number of layers passing through the object.

In yet another way, the inference ratio might be equal to the sum of ratio of height of object to distance of object from sensor and ratio 3, where $$\text{Ratio } 4 = \text{Ratio } 3 + \frac{\text{(Height of object)}}{\text{(Distance of object from the } 3D \text{ sensor)}}$$

During the experimentation stage, all the above calculated four ratios were plotted on a regression curve between the ratio (y axis) and distance from the 3D sensor (x axis), to check which of these ratios provide the most accurate results. This graph also helps to provide the ratio value at a particular value of distance from the 3D sensor but for plotting this graph the ratio values from different distances from the 3D sensor are required.

Figure 3E:
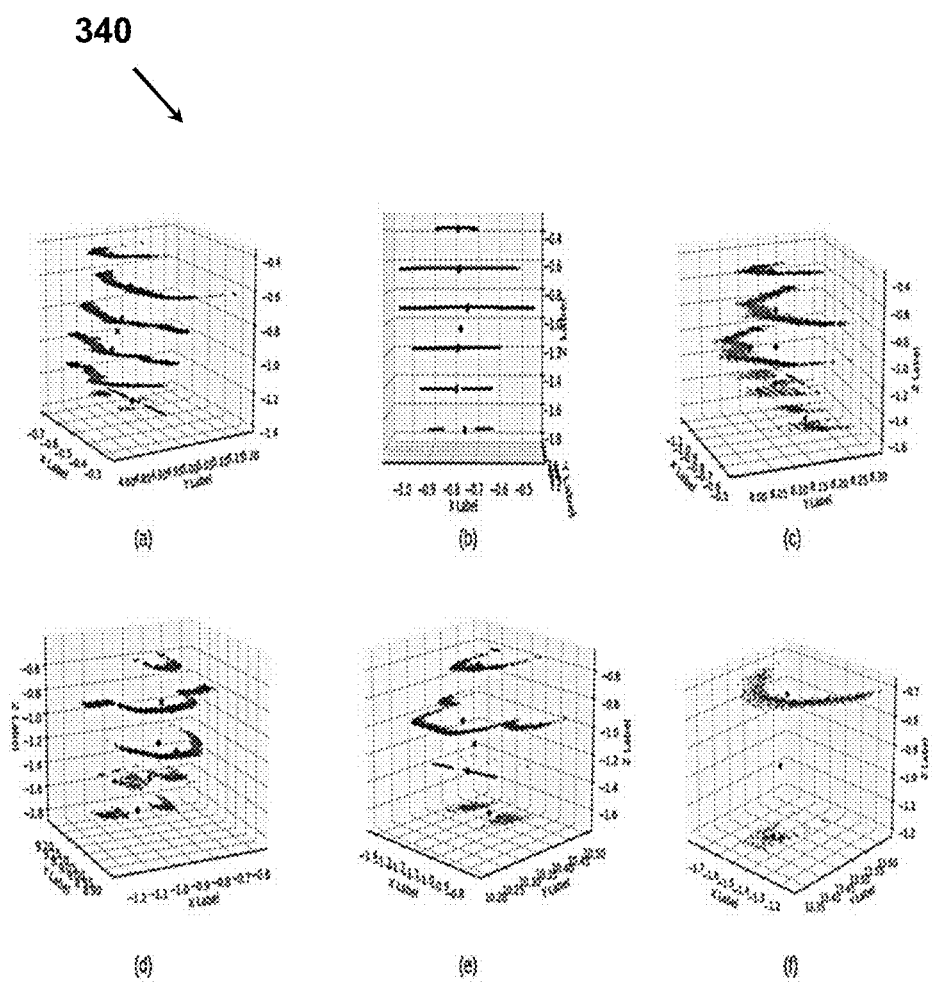
Figure 3F:
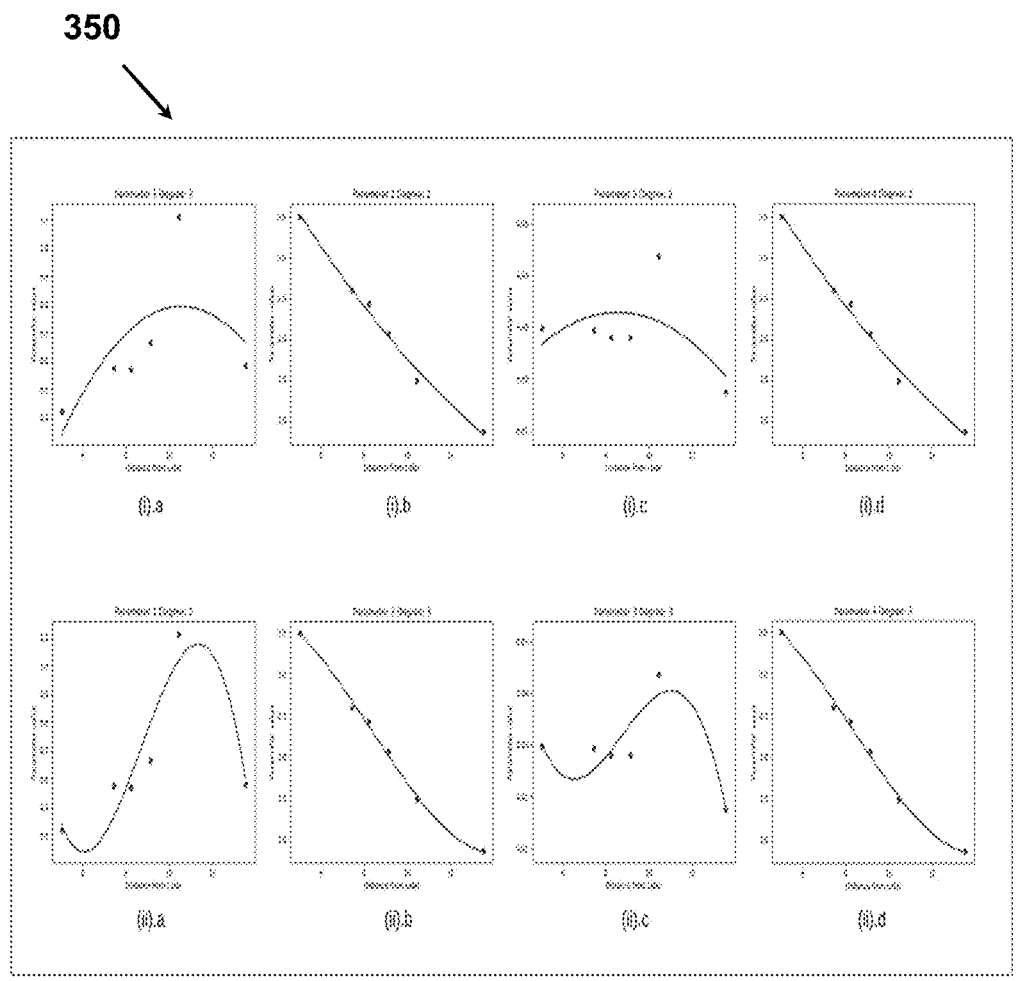

FIG. 3E-3F show one such example, where data of a same person was collected at different distances from a LiDAR (3D sensor), their respective visualizations are shown in FIG. 3E. FIG. 3E shows an example for point cloud visualization from different angles of the same person standing at different positions from the LIDAR or 3D sensor, wherein the distance of the same person is (a) 5 m away, (b) 6 m away, (c) 8 m away, (d) 9 m away, (e) 10 m away and (f) 13 m away from the sensor. The inference ratio is calculated using all methods and the values of all four inference ratios described above have been plotted on a graph shown in FIG. 3F. Using Polynomial regression of degree 2 and 3, it was concluded that, ratio 2 and ratio 4 are best suited to derive a relationship using the tapering nature of the shape of the object such human body and structure of other objects. This conclusion was derived because we were clearly able to define one line of regression which satisfies the values of the 2 ratios at different distances as shown in FIG. 3F.

So, preferably the inference ratio for the searched, detected and segmented object is calculated using the formula provided in ratio 2 and 4.

Returning to FIG. 2, at step 240, the processor (1044) is configured check whether the inference ratio of the searched, detected & segmented object lies on best fit curves pre-generated using a plurality of golden ratios. Each golden ratio is associated with a particular class of the plurality of objects. Herein, the class of objects are selected from, but not limited to, humans, animals, furniture, automobiles, tools and electronics. Each class has its unique golden ratio due to the respective body structure. As illustrated above, that humans have a certain body structure and taper. Similarly, animals have four legs; reptiles have a certain similarities in their body structure; all the cars have a similar basic structure; two vehicles have a similar structure etc. So, all the plurality of objects may be divided into a particular class at a broader level (i.e. golden ratio may easily differentiate between various classes such humans, animals, vehicles etc).

So, in simple terms, it can be understood that the ratio that is calculated in run time for detection & classification is called as the Inference Ratio and the ratio that is pre-calculated to create the best fit curve is called as the golden ratio.

So, even before the beginning of the method (200), the golden ratios are determined for plurality of classes of objects. For that, firstly, a plurality of ratios of a set of objects belonging to a particular class at a plurality of distances from the one or more 3D sensors, are calculated. As previously mentioned, the appropriate ratio (out of the ratio 1, ratio 2, ratio 3 and ratio 4) is selected by generating a curve using the values of the ratio on the y axis and the distance of the object from the sensor on the x axis. The values of the ratio using which a pattern or a curve of regression can be found, is selected to be the best ratio (golden ratio) for the classification out of the four. As found during the experimentation, that ratio 2 and 4 were the best fit and in this manner a respective golden ratio is obtained for the particular class at the plurality of distances. For example: a set of 100 humans (of multiple body sizes) may be used for calculating the golden ratios at a multiple distances from the 3D sensors, using any of the previously mentioned ratio 2 or 4 and accordingly the golden ratio for one class of objects is obtained.

In the same manner, the golden ratios of the plurality of classes of the plurality of objects can be obtained. For example: apart from humans, a set of 100 animals, or 100 cars or other objects may be used for training and modelling. Additionally, the golden ratio for each class of objects is continuously improved by increasing a number/size of the 'set' of objects belonging to the same class used for calculation of the golden ratio, during modelling and training.

For example: the plurality of golden ratios for classifying the detected object as human may be:

| S. No. | Distance From the LiDAR (in meters) | Range of Golden ratios (using Ratio 2) |
| --- | --- | --- |
| 1 | 5.03 | 3.2-3.7 |
| 2 | 7.5 | 2.4-2.8 |
| 3 | 8.2 | 2.2-2.6 |
| 4 | 9.14 | 1.8-2.1 |
| 5 | 10.44 | 1.3-1.7 |
| 6 | 13.5 | 0.7-1.1 |

It will be appreciated by a skilled addressee, that the above-mentioned values/ranges are only exemplary for explanation purpose only. In the actual system (100), the data repository (106) is envisaged to store a vast number of values of golden ratios for every class of objects (required to be identified) and at a large variety of distances between the one or more 3D sensors (102) and object. In one embodiment, the plurality of golden ratios are pre-stored in the data repository (106) for every decimal value from 0-200 meters.

After that, the best fit curve for each of the plurality of classes is generated using the respective plurality of golden ratios and the plurality of distances. It will be appreciated by a skilled addressee that it is not necessary to first calculate golden ratios for all the required classes and then proceed to generate respective best fit curves. This may easily be implemented if the best fit curve for a particular class of object is generated immediately after calculating its respective golden ratio and then process move onto next class of objects.

In one embodiment, the plurality of best fit curves and the golden ratios are pre-calculated/generated and stored in the data repository (106). However, it has already been mentioned that the processing module (104) is capable of implementing artificial intelligence, machine learning and deep learning techniques. So, in a preferred embodiment, the processing module (104) is trained using the pre-calculated/generated best fit curves and golden ratios during the training and modelling phase, that enables the processing module (104) to perform the step 240, in real-time.

Therefore, the processing module (104) may easily check whether the inference ratio (calculated at step 230) of the searched, detected & segmented object lies on any of the best fit curves of respective plurality of classes of the objects, in real-time.

Then at step 250, the processor (1044) determines the class of each of the search, detected and segmented object when the inference ratio successfully lies on a best fit curve associated with the particular class of object. So, returning to FIGS. 3A-3B, it is assumed that an object is detected at a distance of 7.5 meters and the inference ratio is calculated to be 2.58. Further, the inference ratio for that distance is found to be lying on the best fit curve associated with humans. Therefore, the processor (1044) classifies the detected object to be human. Accordingly, the user context application is alerted for the same. Similarly, in this application (that requires classification of humans only), there may be other objects such as animals wandering around the fence, may also be detected. But because their inference ratio does not lie on the best fit curve of the humans, therefore the user context application may not be alerted.

In the same example of FIG. 3A, in one embodiment, the processor (1044) may further be connected with a visual camera or a thermal camera (if required) depending upon the user context application. So, once the object is classified as human, the visual camera or a thermal camera may be actuated to further identify the human as a male or female or for facial recognition of the intruder/human. However, this implementation is solely dependent on the user's requirement. It will be appreciated by a skilled addressee that the present invention does not require any visuals or visual camera to perform the classification.

Apart from the above-mentioned application of perimeter fencing, the present system (100) and method (200) may easily be implemented in surveillance, security, social distancing, people counting, airport automation, animal intrusion detection, border security, Industrial and Warehouse Automation etc. For example: there may be scenario where a secured facility is to be guarded from any human any or vehicles. So, the present invention may easily be implemented to detect and classify all the plurality of object (human, animals & vehicle) that come near the secured facility in real-time and simultaneously.

Also, there may be an application where a user wants to calculate the footfalls in his shopping mall or a number of people present at a particular time in his mall. The present invention may easily perform the required functionalities depending upon the coverage of one or more 3D sensors (102) inside the mall. Counting footfalls is one of the important aspects for various businesses such as shopping malls, cinema halls, super markets etc. Besides, such a functionality can be extremely useful in case of an emergency situation or mishap, as emergency services can clearly know how many people are inside the mall that need to be evacuated or how many were trapped inside at the time of mishappening. Additionally, the present invention may also be used to pin point the position of the object (in this case, humans) inside the space (in this case, mall) to be monitored, which may further help during emergency situation.

Likewise, there are countless possible implementations and innumerable applications where the present invention can prove to be extremely useful and life-saving.

The present invention offers a number of advantages. Firstly, it provides a cost-effective and technologically advanced solution to the problems of the prior art, the solution provided herein is easy to understand and implement. Then, the present invention provides a system and method that uses a minimum amount of storage and processing time to give accurate results, thus making the decisions faster and taking it closer to real time operations. Further, the present invention is efficient in terms of time consumption, resource consumption and cost. Most of the existing art, use only volumetric analysis to classify detected objects in 3d point cloud as humans. But when the space or the population is increased, it is highly likely to have false classifications. This is because when classification of an object is done via volumetric analysis, then a moving object which is not human but of similar volume as human would be classified as a human and therefore the correctness of classification cannot be guaranteed. Also, effects due to adverse weather conditions like high-speed winds can cause foliage to be classified as humans.

The present invention provides a solution to overcome the problems faced by the present LiDAR or 3D sensors and sensing techniques. Hence the present invention utilises the unique feature of taper in the human body along with volume analysis to mitigate these false classifications and improve the human classification ratio of the algorithms. Further, the prior arts have limited use in terms of applicability, whereas the present invention is so flexible in terms of applications that it can be implemented anywhere in perimeter fencing, border security, intrusion detection, Robotics, Industrial and Warehouse Automation, Airport Automation, Security and Surveillance, People Counting, Smart City, advanced driver-assistance systems (ADAS) and other such verticals which primarily require real time classification of objects for the user context application.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof. It should be understood that the techniques of the present disclosure might be implemented using a variety of technologies. For example, the methods described herein may be implemented by a series of computer executable instructions residing on a suitable computer readable medium. Suitable computer readable media may include volatile (e.g., RAM) and/or non-volatile (e.g., ROM, disk) memory, carrier waves and transmission media. Exemplary carrier waves may take the form of electrical, electromagnetic or optical signals conveying digital data steams along a local network or a publicly accessible network such as the Internet.

It should also be understood that, unless specifically stated otherwise as apparent from the following discussion, it is appreciated that throughout the description, discussions utilizing terms such as "controlling" or "obtaining" or "computing" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and the appended claims.

We claim:

1. A method (200) for classification of objects by a body taper detection, the method (200) comprising:

receiving (210) point cloud data of a plurality of objects from one or more 3D sensors (102) disposed in a space to be monitored;

pre-processing (220) the point cloud data to search, detect and segment the plurality of objects, each segmented object comprising a set of horizontal layers of interception from the one or more 3D sensors (102) representing the structure of the segmented object;

calculating (230) an inference ratio of each segmented object using lengths of respective horizontal layers, distances between set of horizontal layers and a distance of each segmented object from the one or more 3D sensors (102);

checking (240) whether the inference ratio of the searched, detected & segmented object lies on best fit curves pre-generated using a plurality of golden ratios associated with a particular class of objects; and determining (250) the class of each of the searched, detected and segmented object when the inference ratio successfully lies on a best fit curve associated with the particular class of object, thereby classifying the plurality of objects in real-time.

2. The method (200) as claimed in claim 1, further comprising a step of calibrating the point cloud data to a single origin, in case there are more than one 3D sensors disposed in the space to be monitored.

3. The method (200) as claimed in claim 1, wherein the plurality of objects are selected from one or more of living and non-living objects including humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

4. The method (200) as claimed in claim 1, wherein the step of calculating the inference ratio of each segmented object includes determining a length of each of the set of horizontal layers of interception from the 3D sensor representing the segmented object.

5. The method (200) as claimed in claim 1, wherein the class of objects are selected from humans, animals, furniture, automobiles, tools and electronics.

6. The method (200) as claimed in claim 5, wherein the plurality of best fit curves associated with the plurality of classes are generated using machine learning by:

calculating a plurality of ratios of a set of objects belonging to a particular class at a plurality of distances from the one or more 3D sensors and obtaining a respective golden ratio for the particular class at the plurality of distances;

obtaining the golden ratios of the plurality of classes of the plurality of objects;

generating the best fit curve for each of the plurality of classes using the respective plurality of golden ratios and the plurality of distances;

wherein the golden ratio for each class of objects is continuously improved by increasing a number/size of the 'set' of objects belonging to the same class used for calculation of the golden ratio, during modelling and training.

7. The method (200) as claimed in claim 1, wherein the one or more 3D sensors (102) are selected from a Light Detection and Ranging (LIDAR) sensor, Laser Detection and Ranging (LaDAR), Light Emitting Diode Detection and Ranging (LeDDAR) mmWave Radar, C or K Band Radar, Time of Flight (ToF) sensors, laser scanners or a combination thereof.

8. The method (200) as claimed in claim 1, further comprising a step of visual identification of the plurality of objects after classification, using one or more visual cameras.

9. A system (100) for classification of objects by a body taper detection, the system (100) comprising:

one or more 3D sensors (102) disposed in a space to be monitored; and a processing module (104) connected with each of the one or more 3D sensors (102), the processing module (104) comprising:

a memory unit (1042) configured to store machine-readable instructions; and a processor (1044) operably connected with the memory unit (1042), the processor (1044) obtaining the machine-readable instructions from the memory unit (1042), and being configured by the machine-readable instructions to:

receive point cloud data of a plurality of objects from the one or more 3D sensors (102);

pre-process the point cloud data to search, detect and segment the plurality of objects, each segmented object comprising a set of horizontal layers of interception from the 3D sensor representing the structure of the segmented object;

calculate an inference ratio of each segmented object using lengths of respective horizontal layers, distances between set of horizontal layers and a distance of each segmented object from the one or more 3D sensors (102);

check whether the inference ratio of the searched, detected & segmented object lies on best fit curves pre-generated using a plurality of golden ratios associated with a particular class of objects; and determine the class of each of the searched, detected and segmented object when the inference ratio successfully lies on a best fit curve associated with the particular class of object, thereby classifying the plurality of objects in real-time.

10. The system (100) as claimed in claim 9, wherein the processor (1044) is further configured to calibrate the point cloud data to a single origin, in case there are more than one 3D sensors disposed in the space to be monitored.

11. The system (100) as claimed in claim 9, wherein the plurality of objects are selected from one or more of living and non-living objects including humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

12. The system (100) as claimed in claim 9, wherein for calculating the inference ratio of each segmented object, the processor (1044) is configured to determine a length of each of the set of horizontal layers of interception from the 3D sensor representing the segmented object.

13. The system (100) as claimed in claim 9, wherein the class of objects are selected from humans, animals, furniture, automobiles, tools and electronics.

14. The system (100) as claimed in claim 13, wherein the plurality of best fit curves associated with the plurality of classes are generated using machine learning by:

calculating a plurality of ratios of a set of objects belonging to a particular class at a plurality of distances from the one or more 3D sensors and obtaining a respective golden ratio for the particular class at the plurality of distances;

obtaining the golden ratios of the plurality of classes of the plurality of objects;

generating the best fit curve for each of the plurality of classes using the respective plurality of golden ratios and the plurality of distances;

wherein the golden ratio for each class of objects is continuously improved by increasing a number/size of the 'set' of objects belonging to the same class used for calculation of the golden ratio, during modelling and training.

15. The system (100) as claimed in claim 9, wherein the one or more 3D sensors (102) are selected from a Light Detection and Ranging (LIDAR) sensor, Laser Detection and Ranging (LaDAR), Light Emitting Diode Detection and Ranging (LeDDAR) mmWave Radar, C or K Band Radar, Time of Flight (ToF) sensors, laser scanners or a combination thereof.

16. The system (100) as claimed in claim 9, wherein the processor (1044) is further configured to facilitate visual identification of the plurality of objects after classification, using one or more visual cameras.

\* \* \* \* \*